United States Patent
Kobayashi et al.

(10) Patent No.: US 9,984,390 B2
(45) Date of Patent: May 29, 2018

(54) INFORMATION DISPLAY DEVICE, DISTRIBUTION DEVICE, INFORMATION DISPLAY METHOD, AND NON-TRANSITORY COMPUTER READABLE STORAGE MEDIUM

(71) Applicant: YAHOO JAPAN CORPORATION, Tokyo (JP)

(72) Inventors: Daisuke Kobayashi, Tokyo (JP); Tatsuaki Suzuki, Tokyo (JP); Kensuke Takada, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1 day.

(21) Appl. No.: 14/800,329

(22) Filed: Jul. 15, 2015

(65) Prior Publication Data
US 2016/0018987 A1 Jan. 21, 2016

(30) Foreign Application Priority Data

Jul. 18, 2014 (JP) ................................. 2014-148239

(51) Int. Cl.
G06Q 30/00 (2012.01)
G06Q 30/02 (2012.01)
(Continued)

(52) U.S. Cl.
CPC ......... G06Q 30/0267 (2013.01); G06F 3/011 (2013.01); G06Q 30/0251 (2013.01);
(Continued)

(58) Field of Classification Search
CPC . G06Q 30/0277; G06Q 30/0269; G06Q 30/02
(Continued)

(56) References Cited

U.S. PATENT DOCUMENTS 4,954,818 A * 9/1990 Nakane .................... G09G 5/14
345/536
5,440,680 A * 8/1995 Ichikawa .................. G09G 5/14
345/536
(Continued)

FOREIGN PATENT DOCUMENTS

JP 2010-526494 A 7/2010
JP 2011-103073 A 5/2011
(Continued)

OTHER PUBLICATIONS

Apr. 19, 2016 Office Action issued in Japanese Patent Application No. 2014-148239.
(Continued)

Primary Examiner — Luis A Brown
Assistant Examiner — Radu Andrei
(74) Attorney, Agent, or Firm — Oliff PLC

(57) ABSTRACT

According to one aspect of an embodiment, an information display device includes a display unit configured to display first content in a region which accounts for a predetermined proportion of a display region and displays second content in another region. The information display device includes a detection unit configured to detect an inclination of the information display device. The information display device includes a change unit configured to change the proportion of the region in which the first content is displayed and the proportion of the region in which the second content is displayed in the display region, depending on the detection result of the detection unit.

14 Claims, 7 Drawing Sheets

(51) Int. Cl.
  *G06T 3/00* (2006.01)
  *G06F 3/01* (2006.01)
  *H04N 21/414* (2011.01)
(52) U.S. Cl.
  CPC ....... *G06Q 30/0269* (2013.01); *G06T 3/0006* (2013.01); *H04N 21/41415* (2013.01)
(58) Field of Classification Search
  USPC .......... 705/14.1, 14.24, 14.25, 14.58, 14.49; 713/176; 382/100, 106
  See application file for complete search history.

(56) References Cited

U.S. PATENT DOCUMENTS

| | | | | |
|---|---|---|---|---|
| 6,169,538 B1* | 1/2001 | Nowlan | ................ | G06F 3/0488 341/22 |
| 6,456,194 B1* | 9/2002 | Carlson | ............. | B60G 17/0165 340/440 |
| 6,493,008 B1* | 12/2002 | Yui | ......................... | G09G 5/08 348/E5.104 |
| 6,600,500 B1* | 7/2003 | Yamamoto | ........... | G06F 3/0481 715/779 |
| 7,956,869 B1* | 6/2011 | Gilra | ..................... | G06F 3/0481 345/157 |
| 8,874,543 B1* | 10/2014 | Coudron | ........... | G06F 17/30864 707/706 |
| 2002/0067433 A1* | 6/2002 | Yui | ......................... | G09G 5/14 348/588 |
| 2006/0055710 A1* | 3/2006 | Lo | ............................ | G09G 5/14 345/629 |
| 2006/0112354 A1* | 5/2006 | Park | ..................... | G06F 3/0481 715/835 |
| 2007/0101289 A1* | 5/2007 | Awada | .................. | G06F 3/0481 715/784 |
| 2007/0247440 A1* | 10/2007 | Shin | ..................... | G06F 3/04883 345/173 |
| 2008/0204424 A1* | 8/2008 | Jin | ........................ | G06F 3/0482 345/173 |
| 2008/0276272 A1* | 11/2008 | Rajaraman | ............. | G06Q 30/02 725/37 |
| 2009/0144574 A1* | 6/2009 | Tseng | .................... | G06F 1/1616 713/323 |
| 2010/0026894 A1* | 2/2010 | Osawa | ............... | H04N 5/44591 348/564 |
| 2010/0077431 A1* | 3/2010 | Neufeld | ................ | G06F 3/0488 725/39 |
| 2010/0122214 A1* | 5/2010 | Sengoku | ............... | G06F 3/0485 715/830 |
| 2010/0231752 A1* | 9/2010 | Lodge | .................. | G09B 21/001 348/231.4 |
| 2010/0263946 A1* | 10/2010 | Miyazaki | ............ | G06F 3/04883 178/2 R |
| 2011/0258053 A1* | 10/2011 | Lee | ........................ | G06Q 30/02 705/14.69 |
| 2012/0056902 A1* | 3/2012 | Yoshino | ................... | G09G 3/20 345/660 |
| 2012/0174028 A1* | 7/2012 | Sirpal | .................... | G06F 1/1616 715/790 |
| 2013/0027719 A1* | 1/2013 | Tsuji | .................. | H04N 1/00424 358/1.9 |
| 2013/0038623 A1* | 2/2013 | Tezuka | ................ | G06F 3/04886 345/589 |
| 2013/0057577 A1* | 3/2013 | Jeong | ..................... | H04N 13/04 345/629 |
| 2013/0100162 A1* | 4/2013 | Iseri | ......................... | G09G 5/14 345/629 |
| 2013/0155185 A1* | 6/2013 | Nishida | .................... | G09G 5/14 348/43 |
| 2014/0036149 A1* | 2/2014 | Ogawa | ............... | H04N 5/44591 348/468 |
| 2014/0237428 A1* | 8/2014 | Miyazaki | ............ | G06F 3/0488 715/833 |
| 2014/0292760 A1* | 10/2014 | Shikolay | ............... | G06F 3/0485 345/428 |
| 2015/0058792 A1* | 2/2015 | Gelernter | .............. | G06F 3/0485 715/784 |
| 2015/0121270 A1* | 4/2015 | Wang | .................... | G06F 3/0481 715/768 |
| 2015/0121300 A1* | 4/2015 | Wang | .................. | G06F 3/04845 715/790 |
| 2015/0181200 A1* | 6/2015 | Arrasvuori | ............... | G06K 9/00 348/46 |
| 2015/0317286 A1* | 11/2015 | Wang | ..................... | G06F 9/4443 715/788 |
| 2015/0348495 A1* | 12/2015 | Kim | ...................... | G06F 3/0484 345/156 |
| 2015/0363084 A1* | 12/2015 | Spjuth | ..................... | G06T 11/60 715/716 |

FOREIGN PATENT DOCUMENTS

| | | |
|---|---|---|
| JP | 2011-209776 A | 10/2011 |
| JP | 2012-252620 A | 12/2012 |
| JP | 2013-175180 A | 9/2013 |
| JP | 2014-099103 A | 5/2014 |
| JP | 2014-149860 A | 8/2014 |
| WO | 2008/137482 A1 | 11/2008 |

OTHER PUBLICATIONS

Jul. 12, 2016 Office Action issued in Japanese Patent Application No. 2014-148239.

Nov. 22, 2016 Office Action issued in Japanese Patent Application No. 2014-148239.

* cited by examiner

| ADVERTISER ID | ADVERTISING CONTENT | BIDDING PRICE | CTR |
|---|---|---|---|
| B10 | C11, DISPLAY INSTRUCTION | 100 | 0.02 |
| | C12 | 50 | 0.01 |
| | C13 | 150 | 0.02 |
| | ... | ... | ... |
| B20 | C21 | 100 | 0.01 |
| | C22 | 50 | 0.02 |
| | ... | ... | ... |
| ... | ... | ... | ... |

INFORMATION DISPLAY DEVICE, DISTRIBUTION DEVICE, INFORMATION DISPLAY METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-148239 filed in Japan on Jul. 18, 2014.

BACKGROUND OF THE INVENTION

1. Field of the Invention

The present invention relates to an information display device, a distribution device, an information display method, and a non-transitory computer readable storage medium having an information displaying program stored therein.

2. Description of the Related Art

In recent years, information has been actively distributed through the Internet. For example, a technique has been known which arranges and displays advertising content, such as a still image, a moving image, or text related to companies or products, at a predetermined position of a web page. In addition, as a technique related to information distribution, a technique has been proposed which displays content, such as a moving image or a web page, on a first layer and displays advertising content on a second layer that is displayed so as to overlap the first layer. Furthermore, a technique has been proposed which changes the display mode of an advertisement, depending on the detection result of a physical sensor.

However, in the above-mentioned techniques according to the related art, in some cases, it is difficult to improve the advertising effect of advertising content. For example, in the related art, when advertising content is displayed on a smart device, such as a smart phone, it is difficult to make the user interested in advertising content since a display screen is small.

SUMMARY OF THE INVENTION

It is an object of the present invention to at least partially solve the problems in the conventional technology.

According to one aspect of an embodiment, an information display device includes a display unit configured to display first content in a region which accounts for a predetermined proportion of a display region and displays second content in another region. The information display device includes a detection unit configured to detect an inclination of the information display device. The information display device includes a change unit configured to change the proportion of the region in which the first content is displayed and the proportion of the region in which the second content is displayed in the display region, depending on the detection result of the detection unit.

According to the other aspect of an embodiment, a distribution device includes a distribution unit configured to distributes control information for controlling a display mode of first content and second content to an information display device. The control information causes the information display device to perform a display process of displaying the first content in a region which accounts for a predetermined proportion of a display region and displaying the second content in another region, a detection process of detecting an inclination of the information display device, and a change process of changing the proportion of the region in which the first content is displayed and the proportion of the region in which the second content is displayed in the display region, depending on the detection result obtained by the detection process.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
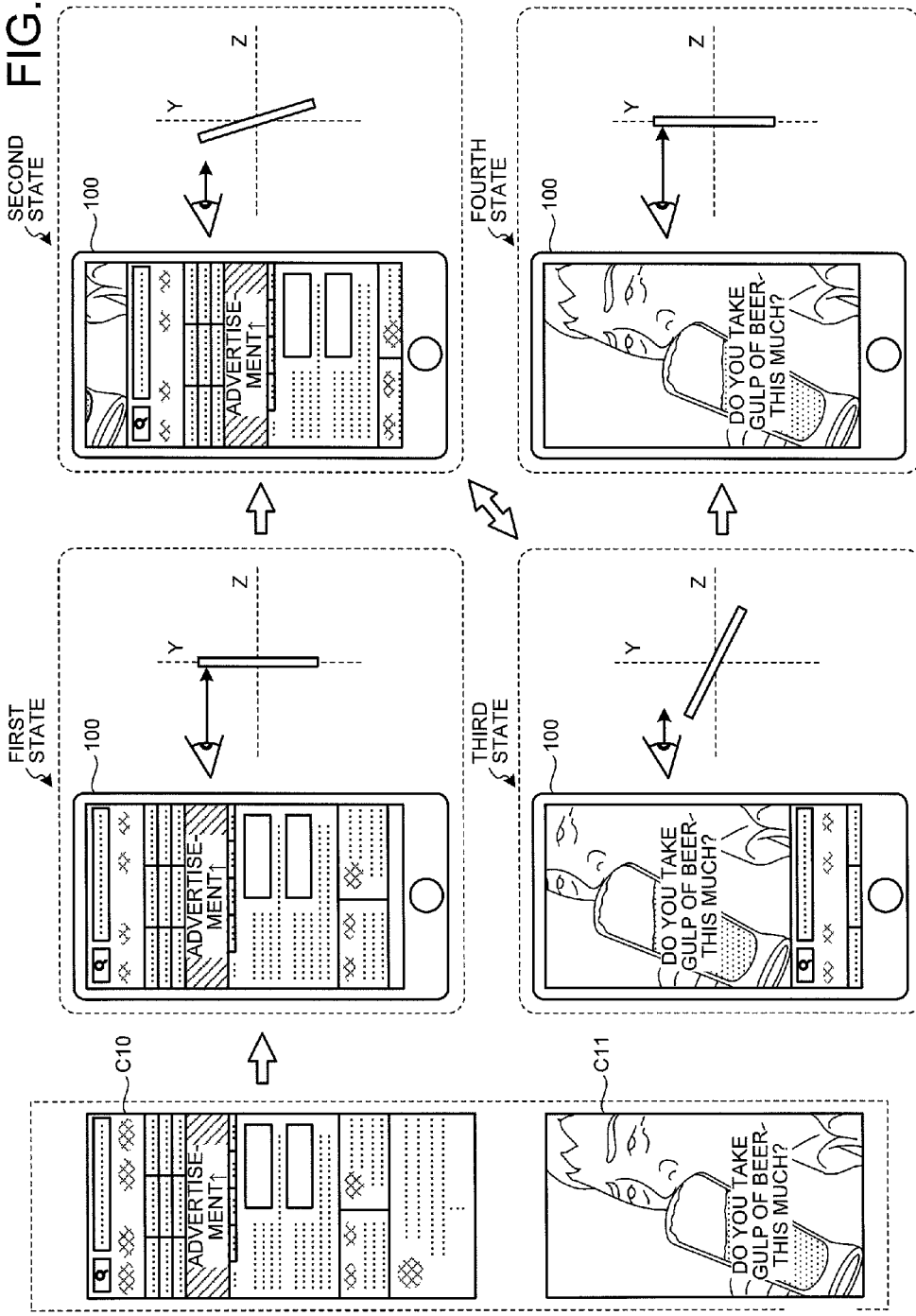
FIG. 1 is a diagram illustrating an example of a terminal device according to an embodiment.

Hereinafter, modes (hereinafter, referred to as "embodiments") for carrying out an information display device, a distribution device, an information display method, and a non-transitory computer readable storage medium having an information display program stored therein according to the invention will be described in detail with reference to the drawings. The information display device, the distribution device, the information display method, and the non-transitory computer readable storage medium having the information display program stored therein according to the invention are not limited by the embodiments. In the following embodiments, the same components are denoted by the same reference numerals and the description thereof will not be repeated.

1. Display Process

First, an example of the process of a terminal device 100, which is an example of the information display device, will be described with reference to FIG. 1. FIG. 1 is a diagram illustrating an example of the terminal device according to an embodiment. FIG. 1 illustrates an example in which the terminal device 100 displays a web page C10 and an advertising content item C11.

The terminal device 100 illustrated in FIG. 1 is a smart device, such as a smart phone or a tablet, and is a mobile terminal device that can communicate with an arbitrary server device through a wireless communication network, such as a third-generation (3G) network or a long term evolution (LTE) network. The terminal device 100 includes an output unit 130 such as a liquid crystal display. It is assumed that a touch panel is used as the terminal device 100. That is, the user of the terminal device 100 touches a display surface of the output unit 130 (hereinafter, referred to as a screen in some cases) with a finger or a dedicated pen to perform various operations.

Here, the terminal device 100 includes a physical sensor 140 that can measure the state of the terminal device 100. For example, the terminal device 100 includes, as the physical sensor 140, a gyro sensor that can measure the rotation of the terminal device 100 about each axis which passes through the terminal device 100, that is, the inclination of the terminal device 100. The terminal device 100 can measure the inclination of the terminal device 100, using the gyro sensor, to detect the inclination of the terminal device 100. In the following description of the process of the terminal device 100, the left-right direction of the screen of the terminal device 100 is referred to as the X-axis, the up-down direction thereof is referred to as the Y-axis, and the front-rear direction thereof is referred to as the Z-axis.

The web page C10 is, for example, a web page in which news, a weather forecast, the index or content of received mail, a photo viewer, and various other kinds of content are arranged and which is described by a hyper text markup language (HTML) or an extensible markup language (XML). The web page C10 includes, for example, an input field for inputting a search keyword and links to other web pages. In the following description, it is assumed that the web page C10 is a web page of a so-called portal site. In addition, it is assumed that the web page C10 is a web page which is optimized for smart devices and has a display size in the vertical direction that is larger than the display size of a display of the terminal device 100 in the vertical direction.

The web page C10 may include content items which are independently arranged in a tile shape. For example, an operation or update may be performed for each of the content items which are arranged in the tile shape. The size or position of each of the tiles arranged in the web page C10 may be automatically changed for each tile or may be changed by the operation of the user.

For example, each news topic is displayed as items of the "latest news" or a "news list" in the web page C10. The news topic corresponds to an anchor text having links to other web pages. In addition, text or buttons, such as "route", "auction", and "shopping", in which links to web pages for providing various services are set are arranged in the web page C10.

In the example illustrated in FIG. 1, a sign (hereinafter, referred to as suggestion display) indicating that an advertisement is arranged above the web page C10 on the screen is arranged in the web page C10. For example, in the web page C10, a suggestion display "Advertisement ↑" is arranged in a region which is displayed by the terminal device 100 in an initial state. The suggestion display illustrated in FIG. 1 is not indispensable in the web page C10. That is, the web page C10 may or may not include the suggestion display.

The advertising content item C11 is, for example, a still image or a moving image which is a portion of an advertisement and is provided by an advertiser. In the example illustrated in FIG. 1, the advertising content item C11 is an image which has the same display size as that of the screen of the terminal device 100 and in which, for example, the image of beer to be advertised, an illustration, and the name of a product to be advertised are arranged.

Specifically, the advertising content item C11 is an image in which beer which is a product and a man who drinks beer are drawn and an advertising copy "Do you take a gulp of beer this much?" is arranged. The content of the advertising content item C11 is not limited to the example illustrated in FIG. 1 and may be advertisements related to any products, such as various articles of food, drinks, and electric appliances, or any services such as communication and transportation.

Here, a link to a predetermined web page (a so-called landing page) is set in the advertising content item C11. When the operation of the user satisfies predetermined conditions, the terminal device 100 displays the landing page set in the advertising content item C11. For example, when the user selects the advertising content item C11, with the entire advertising content item C11 displayed on the screen, the terminal device 100 displays a landing page corresponding to the advertising content item C11. When the advertising content item C11 is selected, the terminal device 100 can display any content, such as a predetermined moving image, in addition to the web page such as the landing page. The detailed process of the terminal device 100 displaying content corresponding to the advertising content item C11 will be described below.

2. Process Performed by Terminal Device 100

Here, the terminal device 100 performs the following process in order to make the user interested in an advertisement. First, when receiving the web page C10 and the advertising content item C11, the terminal device 100 displays the web page C10, which is first content, in a region which accounts for a predetermined proportion in the terminal device 100 and displays the advertising content item C11, which is second content, in another region. For example, in the initial state in which the web page C10 and the advertising content item C11 are received or in the initial state in which the inclination of the terminal device 100 is not detected, the terminal device 100 sets the proportion of the region in which the first content is displayed to the entire screen of the terminal device 100 and arranges the web page C10 in the region. In addition, the terminal device 100 sets the region in which the advertising content item C11 is displayed to the outside of the screen of the terminal device 100, for example, on the upper side of the screen and arranges the advertising content item C11 in the region.

The terminal device 100 performs a scroll operation for the web page C10 in response to the operation of the user. For example, when the user touches the screen with a finger and moves the finger in the upper direction, that is, when a scroll operation of scrolling the web page C10 in the upper direction, the terminal device 100 scrolls the web page C10 in the upper direction and displays a region in which has not been displayed on the screen of the terminal device 100. When the user touches the screen with a finger and moves the finger in the lower direction, that is, when a scroll operation of scrolling the web page C10 in the lower direction, the terminal device 100 scrolls the web page C10 in the lower direction. That is, the terminal device 100 reflects the scroll operation of the user in the region in which the web page C10 is displayed.

When the user performs a scroll operation in the lower direction with the upper end of the web page C10 being displayed, the terminal device 100 does not scroll the web page C10 any further. In addition, the terminal device 100 does not move the region in which the web page C10 is displayed and the region in which the advertising content item C11 is displayed. That is, the terminal device 100 does not display the advertising content item C11 in response to the scroll operation and conceals the advertising content item C11.

In another example, when the user performs a scroll operation in the lower direction with the upper end of the web page C10 being displayed, the terminal device 100 moves the region in which the web page C10 is arranged and the region in which the advertising content item C11 is arranged in response to the scroll operation. Then, when the finger of the user is removed, the terminal device 100 may perform a display process such that the region in which the web page C10 is arranged is matched with the screen. As a result of the display process, the terminal device 100 displays a portion of the advertising content item C11 such that the position of the upper end of the web page C10 is aligned with the position of the lower end of the advertising content item C11. The web page C10 and the advertising content item C11 are displayed in such a way that the display position of the advertising content item C11 returns to the original position, in response to a display process of returning the upper end of the web page C10 to the upper end of the screen. As a result, the terminal device 100 can give the user the impression that the advertising content item C11 is concealed on the upper side of the web page C10.

Then, the terminal device 100 performs the following advertisement display process. First, the terminal device 100 detects the physical state of the terminal device 100. Then, the terminal device 100 changes the proportion of the display region in which the web page C10, which is the first content, is displayed to the screen and the proportion of the region in which the advertising content item C11, which is the second content, is displayed to the screen, depending on the detected state.

2-1. Advertisement Display Process

Next, an example of the advertisement display process performed by the terminal device 100 will be described. First, the terminal device 100 detects the inclination of the terminal device 100 using, for example, the gyro sensor. For example, when the terminal device 100 is inclined in the counterclockwise direction with respect to the X-axis in the Y-Z plane, that is, when the terminal device 100 is inclined to the user who views the screen, the terminal device 100 specifies the inclination angle of the terminal device 100 with respect to the ground or the inclination angle of the terminal device 100 after the terminal device 100 receives the web page C10 and the advertising content item C11.

In addition, the terminal device 100 changes the proportion of the region in which the web page C10 is displayed, depending on the inclination angle of the terminal device 100. For example, the terminal device 100 specifies the detected angle of the terminal device 100 and moves the position of the region in which the web page C10 is displayed and the position of the region in which the advertising content item C11 by a distance corresponding to the specified angle in the lower direction of the screen. As a result, the terminal device 100 moves the region in which the web page C10 is displayed in the lower direction of the screen and displays the advertising content item C11 in a region from the upper side of the screen to the position of the upper end of the web page C10. That is, the terminal device 100 scrolls the web page C10 and the advertising content item C11 which is arranged in a region outside the screen in the lower direction of the screen such that the scroll operation is performed according to the inclination of the terminal device 100.

As a result of this process, the terminal device 100 changes in real time the proportion of the region in which the web page C10 is displayed and the proportion of the region in which the advertising content item C11 is displayed, depending on the angle of the terminal device 100 inclined by the user. For example, the terminal device 100 increases the proportion of the region in which the advertising content item C11 is displayed as the user increases the inclination angle of the terminal device 100 to the front side and decreases the proportion of the region in which the advertising content item C11 is displayed as the user increases the inclination angle of the terminal device 100 to the back side.

When the specified inclination angle of the terminal device 100 exceeds a predetermined threshold value, the terminal device 100 displays the entire advertising content item C11 on the screen. In this case, when the display size of the advertising content item C11 is equal to the display size of the screen of the terminal device 100, the terminal device 100 displays the advertising content item C11 on the entire screen.

When the specified inclination angle of the terminal device 100 exceeds a predetermined threshold value (hereinafter, referred to as a display threshold value), the terminal device 100 fixes the proportions of the regions in which the web page C10 and the advertising content item C11 are displayed. That is, when the angle of the terminal device 100 inclined by the user is greater than the display threshold value, the terminal device 100 does not display the web page C10 and continuously displays the advertising content item C11 on the screen even though the inclined terminal device 100 returns to the original state.

When it is detected that the user has tapped the display region of the advertising content item C11, that is, the user has selected the advertising content item C11, with the proportions of the regions in which the web page C10 and the advertising content item C11 are displayed being fixed, the terminal device 100 displays content such as a landing page corresponding to the advertising content item C11.

When predetermined conditions are satisfied, the terminal device 100 may display the landing page even though the advertising content item C11 is not displayed. For example, when the inclination angle of the terminal device 100 exceeds the predetermined threshold value, the terminal device 100 may cancel the process of moving the region in which the web page C10 or the advertising content item C11 is displayed and display the landing page on the entire screen. That is, when the user suddenly increases the inclination angle of the terminal device 100, the terminal device 100 may not display the advertising content item C11 and may suddenly display the landing page.

When a predetermined period of time has elapsed after the display of the advertising content item C11 on the entire screen, the terminal device 100 may automatically display the landing page. The terminal device 100 may display the landing page as the function of an application or it may execute an application, such as a browser application, to display the landing page.

2-2. Example of Display by Advertisement Display Process

Next, an example of a screen which is displayed when the terminal device 100 performs the advertisement display process will be described with reference to FIG. 1. In the following description, an example in which a change in the display state of the advertising content item C11 by the terminal device 100 in response to the operation of the user is divided into first to fourth states will be described.

First, the terminal device 100 receives the web page C10 and the advertising content item C11. In this case, the terminal device 100 displays the web page C10 on the entire screen. In addition, the terminal device 100 arranges the advertising content item C11 in a region outside the screen. Then, the terminal device 100 displays only the web page C10 on the entire screen when the terminal device 100 is not inclined with respect to the X-axis in the Y-Z plane (for example, when the screen is vertical to the ground), as illustrated in the first state in FIG. 1.

The terminal device 100 may set the inclination of the terminal device 100 in the first state, considering the viewing angle of the user with respect to the screen of the terminal device 100. For example, when the terminal device 100 is inclined at a predetermined angle with respect to the X-axis in the clockwise direction in the Y-Z plane, the terminal device 100 may display only the web page C10 on the entire screen. In addition, the terminal device 100 displays only the web page C10 on the entire screen until the user inclines the terminal device 100 to the front side (in the counterclockwise direction in the Y-Z plane) by a predetermined angle (hereinafter, referred to as a clearance threshold value) with respect to the X-axis from the angle in the first state.

Then, when the inclination angle of the terminal device 100 exceeds the clearance threshold value, the terminal device 100 starts the advertisement display process as illustrated in the second state in FIG. 1. Specifically, the terminal device 100 moves the region in which the web page C10 is displayed and the region in which the advertising content item C11 is displayed by a distance corresponding to the inclination angle of the terminal device 100 in the lower direction of the screen to decrease the proportion of the region in the web page C10 is displayed and to increase the proportion of the region in the advertising content item C11 is displayed in the screen.

Then, when the inclination angle of the terminal device 100 is further increased, the terminal device 100 further decreases the proportion of the region in the web page C10 is displayed and further increases the proportion of the region in the advertising content item C11 is displayed, as illustrated in the third state in FIG. 1. In addition, the terminal device 100 changes the proportions of the regions in which the web page C10 and the advertising content item C11 are displayed until the inclination angle of the terminal device 100 exceeds the display threshold value, depending on the inclination angle of the terminal device 100.

When the inclination angle of the terminal device 100 exceeds the display threshold value, the terminal device 100 displays the advertising content item C11 on the entire screen and fixes the proportion of the region in which the web page C10 is displayed and the proportion of the region in which the advertising content item C11 is displayed. That is, the terminal device 100 does not display the web page C10 and displays only the advertising content item C11 even when the inclination angle of the terminal device 100 returns to that in the first state, as illustrated in the fourth state in FIG. 1.

As such, in the scroll operation, the terminal device 100 does not move the region in which the web page C10 is displayed and the region in which the advertising content item C11 is displayed and performs scroll display for the web page C10 in the region in which the web page C10 is displayed. Then, when the user performs, for example, an operation of inclining the terminal device 100 to change the physical state of the terminal device 100, the terminal device 100 changes the proportion of the region in which the web page C10 is displayed and displays the advertising content item C11 in the remaining region. Therefore, the terminal device 100 can motivate the user to incline the terminal device 100 and to view the advertising content item C11. As a result, the terminal device 100 can make the user interested in an advertisement.

The terminal device 100 may detect a physical state which is detected by an operation related to the advertising content item C11 and display the advertising content item C11 on the basis of the detection result, thereby strongly impressing the content of the advertising content item C11 on the user.

For example, when the user performs an operation of drinking beer, using the terminal device 100 like a glass, it is presumed that the terminal device 100 is inclined to the front side with respect to the X-axis. When the terminal device 100 is inclined to the front side with respect to the X-axis, the terminal device 100 increases the proportion at which the advertising content item C11 related to beer is displayed, according to the inclination angle. When the inclination angle of the terminal device 100 is greater than the display threshold value, for example, when the terminal device 100 is inclined at the angle at which the user simulates the drinking of beer, the terminal device 100 displays the advertising content item C11 on the entire screen. This advertisement display process makes it possible for the terminal device 100 to impress the content of the advertising content item C11 on the user.

2-3. For Execution Subject

Figure 2:
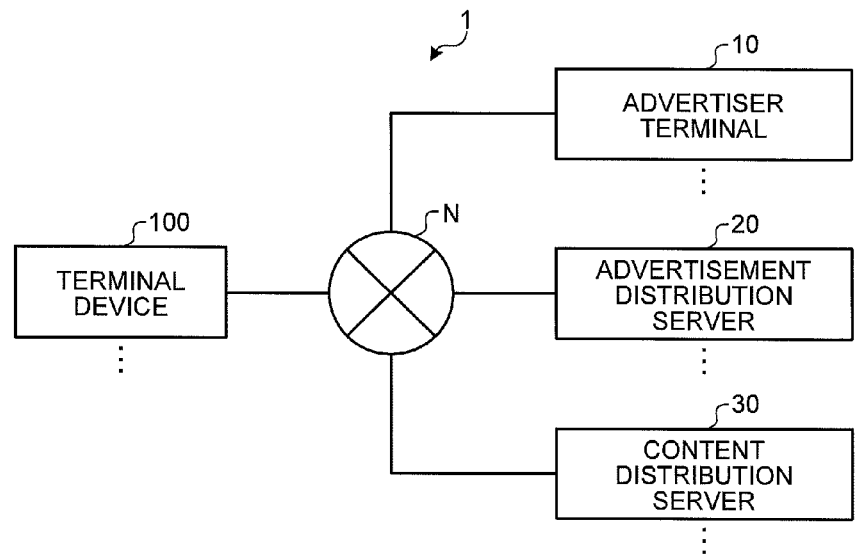
FIG. 2 is a diagram illustrating an example of the structure of an advertisement distribution system according to the embodiment.

The terminal device 100 can achieve the above-mentioned process using an arbitrary method, which has not been described above. For example, the terminal device 100 may download in advance an application which causes the terminal device 100 to perform the display of the web page C10 and the above-mentioned advertisement display process and execute the application at any time to achieve the above-mentioned process. In addition, the terminal device 100 may receive distributed control information for performing the advertisement display process at the same time as the web page C10 or the advertising content item C11 is distributed. Then, the terminal device 100 performs the advertisement display process on the basis of the control information. Next, for example, the terminal device 100 which performs the advertisement display process on the basis of the control information will be described. 3. Structure of Advertisement Distribution System Next, for example, the terminal device 100 which achieves the above-mentioned display process will be described. First, the structure of an advertisement distribution system 1 according to the embodiment will be described with reference to FIG. 2. FIG. 2 is a diagram illustrating an example of the structure of the advertisement distribution system according to the embodiment. As illustrated in FIG. 2, the advertisement distribution system 1 includes the terminal device 100, an advertiser terminal 10, an advertisement distribution server 20, and a content distribution server 30. The terminal device 100, the advertiser terminal 10, the advertisement distribution server 20, and the content distribution server 30 are connected through a network N such that they can communicate with each other wirelessly or in a wired manner. The advertisement distribution system 1 illustrated in FIG. 2 may include a plurality of terminal devices 100, a plurality of advertiser terminals 10, a plurality of advertisement distribution servers 20, or a plurality of content distribution servers 30.

The terminal device 100 is an information processing device used by the user who browses a web page. For example, the terminal device 100 is a mobile phone, such as a smart phone, a tablet terminal, a personal digital assistant (PDA), a desktop personal computer (PC), or a notebook PC. The terminal device 100 acquires the web page C10 from the content distribution server 30 and displays the acquired web page C10, in response to the operation of the user. When the web page C10 includes an advertisement acquisition command which will be described below, the terminal device 100 acquires the advertising content item C11 from the advertisement distribution server 20 and displays the acquired advertising content item C11 together with the web page C10.

The advertiser terminal 10 is an information processing device which is used by an advertiser. For example, the advertiser terminal 10 is a desktop PC, a notebook PC, a tablet terminal, a mobile phone, or a PDA. The advertiser terminal 10 submits the advertising content item C11 to the advertisement distribution server 20 in response to the operation of the advertiser. For example, the advertiser terminal 10 submits, as the advertising content item C11, a still image, a moving image, text data, or a uniform resource locator (URL) for acquiring content (for example, a landing page) corresponding to the advertising content item C11 to the advertisement distribution server 20.

In some cases, the advertiser requests an agency to submit advertising content. In this case, the agency transmits advertising content to the advertisement distribution server 20. Hereinafter, the concept of the term "advertiser" includes not only the advertiser but also the agency. The concept of the term "advertiser terminal" includes not only the advertiser terminal 10 but also an agency device used by the agency.

The advertisement distribution server 20 is a server device which distributes the advertising content submitted from the advertiser terminal 10. For example, when the advertisement distribution server 20 is accessed by the terminal device 100, the advertisement distribution server 20 performs advertisement matching on the basis of the position of the terminal device 100 or the attributes of the user and distributes, to the terminal device 100, advertising content which is determined be distributed on the basis of the matching result. In addition, the advertisement distribution server 20 distributes, to the terminal device 100, control information indicating the display mode of the advertising content to be distributed together with the advertising content. The control information is described by, for example, a script language, such as JavaScript (registered trademark) or Cascading Style Sheets (CSS).

The content distribution server 30 is, for example, a web server which distributes the web page C10 to the terminal device 100. For example, the content distribution server 30 distributes, to the terminal device 100, the web page C10 of a portal site including various kinds of information related to a portal site, a news site, an auction site, a weather forecast site, a shopping site, a finance (stock) site, a route search site, a map provision site, a tourism site, a restaurant introduction site, and a web blog. The content distribution server 30 may be a server which transmits, to the terminal device 100, a web page in which various kinds of information are arranged in a tile shape and information is updated for each tile.

Here, the web page C10 distributed by the content distribution server 30 includes an advertisement acquisition command. For example, the URL of the advertisement distribution server 20 is described as the advertisement acquisition command in the HTML file forming the web page C10. In this case, the terminal device 100 accesses the URL described in, for example, the HTML file to acquire the advertising content item C11 from the advertisement distribution server 20.

For example, various kinds of data which are distributed from the content distribution server 30 to the terminal device 100 are actually an HTML file or an image forming a web page and a moving image which is superimposed on the web page and is then displayed. Hereinafter, in some cases, various kinds of data which are distributed from the content distribution server 30 to the terminal device 100 are referred to as content.

4. Structure of Advertisement Distribution Server

Figure 3:
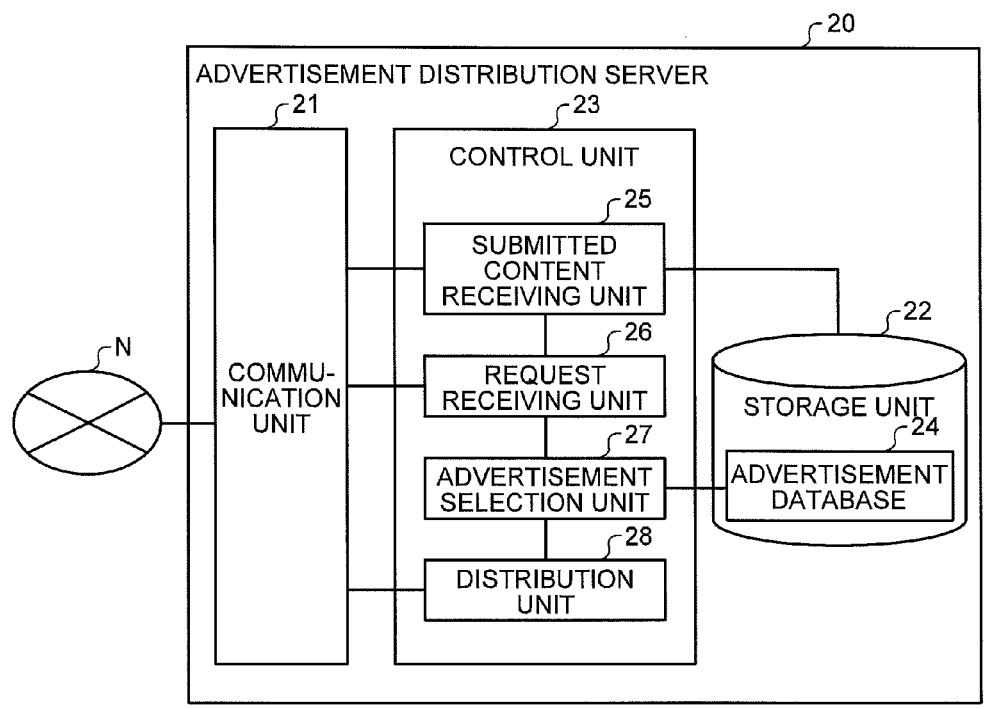
FIG. 3 is a diagram illustrating an example of the structure of an advertisement distribution server according to the embodiment.

Next, the structure of the advertisement distribution server 20 according to the embodiment will be described with reference to FIG. 3. FIG. 3 is a diagram illustrating an example of the structure of the advertisement distribution server according to the embodiment. As illustrated in FIG. 3, the advertisement distribution server 20 includes a communication unit 21, a storage unit 22, and a control unit 23.

The communication unit 21 is, for example, a network interface card (NIC). The communication unit 21 is connected to the network N wirelessly or in a wired manner and transmits and receives information to and from the terminal device 100, the advertiser terminal 10, and the content distribution server 30.

The storage unit 22 is, for example, a semiconductor memory device, such as random access memory (RAM) or flash memory, or a storage device, such as a hard disk or an optical disk. The storage unit 22 stores an advertisement database 24 in which various kinds of information related to advertising content which is submitted from the advertiser terminal 10 are stored.

Figures 4, 5:
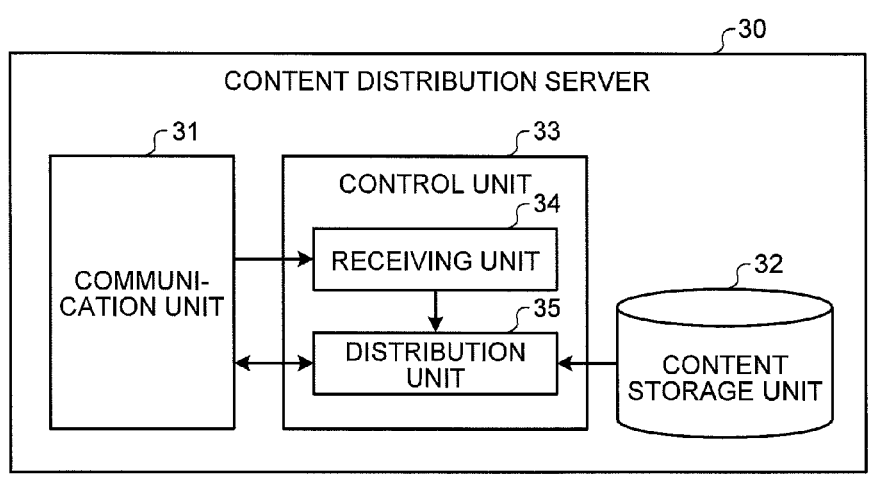
FIG. 4 is a diagram illustrating an example of information stored in an advertisement database according to the embodiment.
FIG. 5 is a diagram illustrating an example of the structure of a content distribution server according to the embodiment.

FIG. 4 is a diagram illustrating an example of the information stored in the advertisement database according to the embodiment. In the example illustrated in FIG. 4, the advertisement database 24 has items, such as an "advertiser ID", "advertising content", a "bidding price", and a "click through rate (CTR)".

The "advertiser ID" is identification information for identifying the advertiser or the advertiser terminal 10. The "advertising content" indicates advertising content which is submitted from the advertiser terminal 10. FIG. 4 illustrates an example in which conceptual information, such as "C11" or "C12", is stored as the "advertising content". However, in practice, for example, a still image, a moving image, text data, a URL, or a file path name indicating the storage position thereof is stored.

The "bidding price" indicates an advertisement rate which is designated when the advertiser submits advertising content. For example, the "bidding price" corresponds to a unit price which is paid to the advertisement distributor (for example, the administrator of the advertisement distribution server 20 or the content distribution server 30) by the advertiser when advertising content is displayed in a web page once. For example, the "bidding price" may be the amount of money corresponding to a unit price which is paid to the advertisement distributor by the advertiser when the user selects advertising content once.

The "CTR" indicates a value obtained by dividing the number of times advertising content is clicked by the number of times advertising content is displayed. The CTR of advertising content which has not been distributed to the terminal device 100 stores, for example, a predetermined fixed value, the average value of the CTRs of all advertising content items, and the average value of the CTRs of all of the advertising content items belonging to the same advertisement category (for example, a car or travel). In addition, the "CTR" may store a predicted CTR which is predicted by, for example, a CTR prediction model. The predicted CTR is predicted by, for example, the type of advertising content or the type of web page in which advertising content is displayed.

That is, FIG. 4 illustrates an example in which an advertiser who is identified by an advertiser ID "B10" designates a bidding price "100" and submits advertising content "C11". In addition, FIG. 4 illustrates an example in which the CTR of the advertising content "C11" is "0.02".

Here, advertising content which is displayed in an advertisement frame 50 and a display instruction indicating how to display each advertising content item are registered as the advertising content in the advertisement database 24. For example, in the example illustrated in FIG. 4, it is assumed that the advertising content item C11 illustrated in FIG. 1 and a display instruction to perform the advertisement display process illustrated in FIG. 1 are registered as the advertising content in the advertisement database 24. In addition, it is assumed that the display instruction includes information, such as the display threshold value or the clearance threshold value which is registered by the advertiser, the inclination direction of the terminal device 100 to be detected, the amount of movement of the web page C10 corresponding to the inclination angle, and a URL for accessing a landing page.

The description is continued with reference to FIG. 3. For example, a central processing unit (CPU) or a micro processing unit (MPU) executes various programs stored in a storage device of the advertisement distribution server 20, using RAM as a work area, to implement the functions of the control unit 23. In addition, the control unit 23 is implemented by an integrated circuit, such as an application specific integrated circuit (ASIC) or a field programmable gate array (FPGA).

As illustrated in FIG. 3, the control unit 23 includes a submitted content receiving unit 25, a request receiving unit 26, an advertisement selection unit 27, and a distribution unit 28 and implements or performs the following information processing function or operation. The internal structure of the control unit 23 is not limited to that illustrated in FIG. 3 and the control unit 23 may have any other structures as long as it can perform the following information processing. In addition, the connection relationship between the processing units provided in the control unit 23 is not limited to that illustrated in FIG. 3 and the processing units may have other connection relationship therebetween.

The submitted content receiving unit 25 receives the advertising content submitted from the advertiser terminal 10. Specifically, the submitted content receiving unit 25 receives the designated bidding price and the submitted advertising content. In addition, the submitted content receiving unit 25 receives the advertising content item C11 and the display instruction. In this case, the submitted content receiving unit 25 registers the advertising content item C11 and the display instruction in the advertisement database 24 together with the advertiser ID and the received bidding price.

The request receiving unit 26 receives an advertising content acquisition request from the terminal device 100. For example, the request receiving unit 26 receives an HTTP request as the advertising content acquisition request.

When the request receiving unit 26 receives the advertising content acquisition request, the advertisement selection unit 27 selects the advertising content to be distributed from the advertisement database 24. For example, the advertisement selection unit 27 performs the matching of the advertising content to be distributed from the advertising content items registered in the advertisement database 24, on the basis of the position of the terminal device 100 or the attributes of the user. In the matching process, advertising content having a high bidding price or a high CTR or advertising content having both a high bidding price and a high CTR may be preferentially selected. Then, the advertisement selection unit 27 outputs the advertising content which has been selected as a distribution target to the distribution unit 28.

When the web page is a search page, the advertisement selection unit 27 may use an advertisement distribution method which is called search advertising for extracting advertising content matched with a search keyword that is designated in the search page. In addition, the advertisement selection unit 27 may use an advertisement distribution method which is called targeting distribution for extracting advertising content matched with the attribute information (for example, psychographic attributes and demographic attributes) of the user.

The distribution unit 28 distributes the advertising content selected by the advertisement selection unit 27 and the control information to the terminal device 100. Specifically, when receiving the advertising content selected by the advertisement selection unit 27, the distribution unit 28 extracts the display instruction included in the received advertising content. Then, the distribution unit 28 generates control information which causes the terminal device 100 to perform the advertisement display process indicated by the extracted display instruction. Then, the distribution unit 28 distributes the generated control information and the data of an image or a moving image included in the advertising content to the terminal device 100.

5. Structure of Content Distribution Server 30

Next, the structure of the content distribution server 30 according to the embodiment will be described with reference to FIG. 5. FIG. 5 is a diagram illustrating an example of the structure of the content distribution server according to the embodiment. As illustrated in FIG. 5, the content distribution server 30 includes a communication unit 31, a content storage unit 32, and a control unit 33.

The communication unit 31 is, for example, an NIC. The communication unit 31 is connected to the network N wirelessly or in a wired manner and transmits and receives information to and from the terminal device 100 or the advertisement distribution server 20.

The content storage unit 32 is, for example, a semiconductor memory device, such as RAM or flash memory, or a storage device, such as a hard disk or an optical disk. The content storage unit 32 stores a web page which is an example of content. For example, the content storage unit 32 stores an HTML file forming a web page or a still image or a moving image displayed in a web page.

For example, a CPU or an MPU executes various programs (corresponding to an example of a distribution program) stored in a storage device of the content distribution server 30, using RAM as a work area, to implement the function of the control unit 33. In addition, the control unit 33 is implemented by an integrated circuit, such as an ASIC or an FPGA.

As illustrated in FIG. 5, the control unit 33 includes a receiving unit 34 and a distribution unit 35 and implements or performs the following information processing function or operation. The internal structure of the control unit 33 is not limited to that illustrated in FIG. 5 and the control unit 33 may have any other structures as long as it can perform the following information processing. In addition, the connection relationship between the processing units provided in the control unit 33 is not limited to that illustrated in FIG. 5 and the processing units may have other connection relationship therebetween.

The receiving unit 34 receives a web page acquisition request from the terminal device 100. For example, the receiving unit 34 receives an HTTP request as the web page acquisition request.

When the receiving unit 34 receives the web page acquisition request, the distribution unit 35 distributes a web page to the terminal device 100. Specifically, the distribution unit 35 acquires a web page corresponding to the acquisition request from the content storage unit 32 and distributes the acquired web page to the terminal device 100. In this case, when receiving the web page C10, the terminal device 100 transmits an advertisement distribution request to the advertisement distribution server 20 and displays advertising content which is received as a response according to the advertisement display process.

6. Structure of Terminal Device

Figure 6:
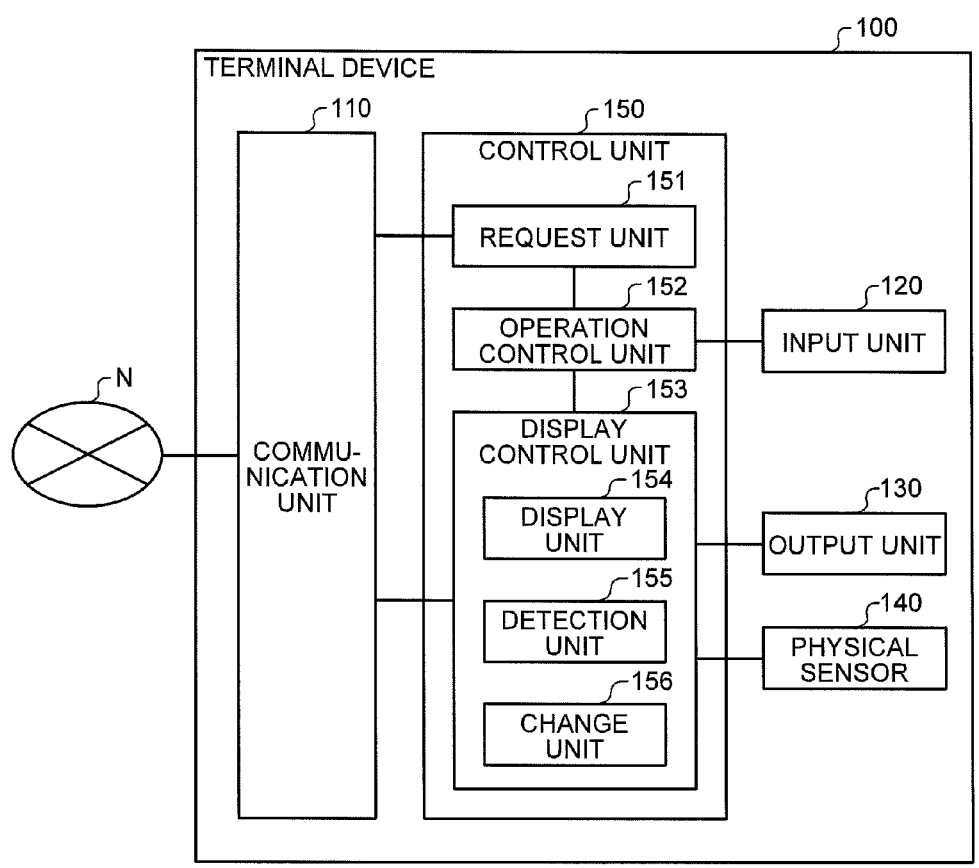
FIG. 6 is a diagram illustrating an example of the structure of a terminal device according to the embodiment.

Next, the structure of the terminal device 100 according to the embodiment will be described with reference to FIG. 6. FIG. 6 is a diagram illustrating an example of the terminal device according to the embodiment. As illustrated in FIG. 6, the terminal device 100 includes a communication unit 110, an input unit 120, an output unit 130, a physical sensor 140, and a control unit 150.

The communication unit 110 is, for example, an NIC. The communication unit 110 is connected to the network N wirelessly or in a wired manner and transmits and receives information to and from the advertisement distribution server 20 or the content distribution server 30.

The input unit 120 is an input device that receives various operations from the user. For example, the input unit 120 is, for example, a keyboard, a mouse, or an operation key. The output unit 130 is a display device for displaying various kinds of information. For example, the output unit 130 is a liquid crystal display. When a touch panel is provided in the terminal device 100, the input unit 120 and the output unit 130 are integrated with each other.

The physical sensor 140 is a sensor that detects the physical state of the terminal device 100. For example, the physical sensor 140 is a gyro sensor that measures the inclination of the terminal device 100 in three axial directions. The physical sensor 140 is not limited to a gyro sensor and may be any sensor, such as an acceleration sensor, a temperature sensor, a volume sensor, or a brightness sensor.

For example, a CPU or an MPU executes various programs (corresponding to an example of a display program) stored in a storage device of the terminal device 100, using RAM as a work area, to implement the function of the control unit 150. For example, various programs correspond to an application program which is called a web browser. In addition, the control unit 150 is implemented by an integrated circuit, such as an ASIC or an FPGA.

As illustrated in FIG. 6, the control unit 150 includes a request unit 151, an operation control unit 152, and a display control unit 153 and implements or performs the following information processing function or operation. The internal structure of the control unit 150 is not limited to that illustrated in FIG. 6 and the control unit 150 may have any other structures as long as it can perform the following information processing. In addition, the connection relationship between the processing units provided in the control unit 150 is not limited to that illustrated in FIG. 6 and the processing units may have other connection relationship therebetween.

When receiving the URL of the web page C10 from the operation control unit 152, the request unit 151 transmits an acquisition request of the web page C10 indicated by the received URL to the content distribution server 30. In addition, when an advertisement acquisition command is included in the web page received from the content distribution server 30, the request unit 151 transmits an advertising content acquisition request to the advertisement distribution server 20.

The operation control unit 152 performs various control processes in response to the operation of the user received through the input unit 120. For example, when the user uses the input unit 120 to perform an operation for displaying the web page C10, the operation control unit 152 outputs the URL of the web page C10 to be displayed to the request unit 151. In addition, the operation control unit 152 outputs the content of the operation of the user which has been input through the input unit 120 to the display control unit 153. When the web page C10 received by the display control unit 153 includes an advertisement acquisition command, the operation control unit 152 instructs the request unit 151 to transmit an advertising content acquisition request to the advertisement distribution server 20.

The display control unit 153 performs a process of displaying the received web page and advertising content on the output unit 130. For example, the control unit 150 executes the control information which is distributed together with the advertising content to operate the display control unit 153 as a display unit 154, a detection unit 155, and a change unit 156 and to perform the advertisement display process, as illustrated in FIG. 6. For example, a CPU or an MPU executes the control information, using RAM as a work area, to implement the functions of the display unit 154, the detection unit 155, and the change unit 156.

The display unit 154 displays the web page C10 in a region which accounts for a predetermined proportion of the screen and displays the advertising content item C11 in other region. Specifically, when the web page C10 and the advertising content item C11 are received in response to the request from the request unit 151, the display unit 154 sets the entire screen as the display region of the web page C10 and directs the output unit 130 to display the web page C10. The display unit 154 arranges the region in which the advertising content item C11 is displayed outside the screen. The proportion of each region in the initial state is not limited to the above-mentioned example. For example, the display unit 154 may display the web page C10 in a portion of the screen or display the advertising content item C11 in other regions.

When the content of the operation of the user is received from the operation control unit 152, the display unit 154 controls the display content of the output unit 130 on the basis of the received operation of the user. For example, when receiving information indicating that a scroll operation has been performed in the vertical direction from the operation control unit 152, the display unit 154 scrolls the web page C10. The display unit 154 does not move the position of the region in which the advertising content item C11 is displayed and maintains the position of the region outside the screen, according to the type of scroll operation.

The display unit 154 changes the display mode of each advertising content item C11 displayed in the advertisement frame 50 in response to an instruction from the change unit 156. For example, when receiving an instruction to change the proportion of the region in which the web page C10 is displayed from the change unit 156, the display unit 154 moves the region in which the web page C10 is displayed and the region in which the advertising content item C11 is displayed until the proportion of the region in which the web page C10 is displayed is equal to the received percentage. That is, the display unit 154 displays a portion of the advertising content item C11 in a region which is generated with the movement of the region in which the web page C10 is displayed.

When receiving an instruction to fix the proportion of the region in which the web page C10 is displayed, the display unit 154 fixes the proportion of the region in which the web page C10 is displayed and the proportion of the region in which the advertising content item C11 is displayed. In addition, in a case in which the proportion of the region in which the web page C10 is displayed and the proportion of the region in which the advertising content item C11 is displayed are fixed, when the user selects the advertising content item C11, the display unit 154 displays the advertising content item C11 which can change to predetermined content. For example, when receiving a notice indicating that the user has selected the advertising content from the operation control unit 152 after an instruction to fix the proportion of the region in which the web page C10 is displayed is received, the display unit 154 displays predetermined content, for example, a landing page corresponding to the selected advertising content.

When the user taps the region in which the advertising content item C11 is displayed while the proportion of the region in which the web page C10 is displayed and the proportion of the region in which the advertising content item C11 is displayed are being changed under the control of the change unit 156, the display unit 154 may not display the landing page. That is, even when the user taps the advertising content C11, the display unit 154 does not display the landing page until the inclination angle of the terminal device 100 exceeds the display threshold value.

On the other hand, when the user taps the region in which the web page C10 is displayed while the proportion of the region in which the web page C10 is displayed and the proportion of the region in which the advertising content item C11 is displayed are being changed under the control of the change unit 156, the display unit 154 performs various processes corresponding to the tapped position. For example, when the user selects text in which a link is set in the web page C10, the display unit 154 displays content such as a web page corresponding to the set link.

The detection unit 155 detects the physical state of the terminal device 100. For example, the detection unit 155 detects the inclination angle of the terminal device 100 using the physical sensor 140 and notifies the change unit 156 of the detected angle. The detection unit 155 may detect the inclination direction of the terminal device 100 and notify the change unit 156 of the detected direction. In addition, when the inclination angle of the terminal device 100 is equal to or greater than a predetermined threshold value, the detection unit 155 may notify the change unit 156 of the detection result indicating that the terminal device 100 is inclined.

The detection unit 155 may detect an impact applied to the terminal device 100 using the physical sensor 140. For example, the detection unit 155 may measure the acceleration of the terminal device 100 using the physical sensor 140. When a variation in the measured acceleration is greater than a predetermined threshold value, the detection unit 155 may notify the change unit 156 of the detection result indicating that an impact is applied to the terminal device 100.

For example, the detection unit 155 may detect a predetermined operation of the user using the input unit 120 and the physical sensor 140. Specifically, when the input unit 120 detects the touch of the user on the screen at the same time as the physical sensor 140 detects an impact, the detection unit 155 may notify the change unit 156 of the detection result indicating that the user knocks the screen.

The process performed by the detection unit 155 is illustrative. The detection unit 155 can detect the arbitrary physical state of the terminal device 100 using an arbitrary sensor provided in the terminal device 100.

The change unit 156 changes the proportion of the region in which the web page C10 is displayed and the proportion of the region in which the advertising content item C11 is displayed, on the basis of the detection result of the detection unit 155. For example, the change unit 156 receives the inclination angle of the terminal device 100 from the detection unit 155. Then, the change unit 156 calculates the proportion of the region in which the web page C10 is displayed, on the basis of the inclination angle of the terminal device 100, and notifies the display unit 154 of the calculated percentage. That is, the change unit 156 moves the region in which the web page C10 is displayed and the region in which the advertising content item C11 is displayed by a distance corresponding to the inclination angle. As a result, the change unit 156 displays the advertising content item C11 in a region which is generated with the movement of the region in which the web page C10 is displayed.

The change unit 156 determines whether the inclination angle of the terminal device 100 exceeds a predetermined threshold value. When it is determined that the inclination angle of the terminal device 100 exceeds the predetermined threshold value, the change unit 156 performs the following process. First, the change unit 156 moves the region in which the web page C10 is displayed and the region in which the advertising content item C11 is displayed until the advertising content item C11 is displayed on the entire screen. That is, the change unit 156 displays the entire advertising content item C11. Then, the change unit 156 outputs an instruction to fix the proportion of the region in which the web page C10 is displayed to the display unit 154. That is, when the inclination angle of the terminal device 100 exceeds the predetermined threshold value, the change unit 156 does not display the web page C10 and displays the advertising content item C11 on the entire screen even though the inclination angle of the terminal device 100 is changed thereafter.

7. Variation in Advertisement Display Process

An example of the advertisement display process of the terminal device 100 has been described above using the display mode illustrated in FIG. 1. However, the embodiment is not limited thereto. Next, a variation in the advertisement display process of the terminal device 100 will be described. For example, the change unit 156 may control the display unit 154 such that the following advertisement display process is implemented.

7-1. Process Corresponding to Inclination Direction

For example, the terminal device 100 may change the area of the region in which the web page C10 is displayed, depending on the inclination direction of the terminal device 100. For example, only when the terminal device 100 is inclined in a predetermined direction, the terminal device 100 may perform the advertisement display process. In addition, for example, the terminal device 100 may change the direction in which the display regions of the web page C10 and the advertising content item C11 are moved, depending on the inclination direction of the terminal device 100.

For example, when the terminal device 100 is inclined in the clockwise direction with respect to the X-axis in the Y-Z plane, that is, when the terminal device 100 is inclined to the back side as viewed from the user, the terminal device 100 moves the region in which the web page C10 is displayed in the upper direction of the screen and moves the region in which the advertising content item C11 is displayed in the lower direction of the screen. That is, the terminal device 100 displays the advertising content item C11 in a region, which is generated in a lower part of the screen with the movement of the region in which the web page C10 is displayed, from the upper side.

In another example, when the terminal device 100 is inclined in the clockwise direction with respect to the Y-axis in the X-Z plane, that is, when the terminal device 100 is inclined to the left side as viewed from the user, the terminal device 100 moves the region in which the web page C10 is displayed to the left side on the screen and moves the region in which the advertising content item C11 is displayed from the left side to the right side on the screen. That is, the terminal device 100 displays the advertising content item C11 in a region, which is generated on the right side of the screen with the movement of the region in which the web page C10 is displayed, from the left side.

When the terminal device 100 is inclined in the counter-clockwise direction with respect to the Y-axis in the X-Z plane, that is, when the terminal device 100 is inclined to the right back side as viewed from the user, the terminal device 100 moves the region in which the web page C10 is displayed and the region in which the advertising content item C11 is displayed to the right side of the screen. That is, the terminal device 100 displays the advertising content item C11 in a region, which is generated in a left part of the screen with the movement of the region in which the web page C10 is displayed, from the right side.

That is, the terminal device 100 may display the advertising content item C11 in a region which is generated by the movement of the display region of the web page C10 in the inclination direction of the terminal device 100. The terminal device 100 can perform this process to make the user interested in an advertisement.

The terminal device 100 may display different advertising content items, according to the inclination direction of the terminal device 100. For example, when the terminal device 100 is inclined to the upper side as viewed from the user, the terminal device 100 moves the region in which the web page C10 is displayed in the upper direction of the screen and displays first advertising content from the lower side of the screen. On the other hand, when the terminal device 100 is inclined to the left side as viewed from the user, the terminal device 100 moves the region in which the web page C10 is displayed in the left direction of the screen and displays second advertising content from the right side of the screen.

When the terminal device 100 is inclined to the lower side as viewed from the user, the terminal device 100 moves the region in which the web page C10 is displayed in the lower direction of the screen and displays third advertising content from the upper side of the screen. When the terminal device 100 is inclined to the right side as viewed from the user, the terminal device 100 moves the region in which the web page C10 is displayed in the right direction of the screen and displays fourth advertising content from the left side of the screen. The terminal device 100 can perform this process to motivate the user to incline the terminal device 100 in various directions and to view each advertising content item. As a result, the terminal device 100 can make the user interested in an advertisement.

7-2. Process Corresponding to Inclination Angle

The terminal device 100 may perform the advertisement display process according to the inclination angle. For example, the terminal device 100 does not move the region in which the web page C10 is displayed until the inclination angle exceeds a predetermined threshold value. Then, when the inclination angle exceeds the predetermined threshold value, the terminal device 100 may move the region in which the web page C10 is displayed to the outside of the screen and move the region in which the advertising content item C11 is displayed to the inside of the screen, with the movement of the region in which the web page C10 is displayed, thereby displaying the advertising content item C11 on the entire screen. When the inclination angle of the terminal device 100 exceeds the predetermined threshold value, the terminal device 100 may display and reproduce a moving image related to the advertising content item C11 on the entire screen.

7-3. Output of Content Corresponding to Operation

In the above-mentioned example, in a case in which the proportion of the region in which the web page C10 is displayed and the proportion of the region in which the advertising content item C11 is displayed are fixed, when the user selects the advertising content item C11, the terminal device 100 displays the landing page corresponding to the advertising content item C11. However, the embodiment is not limited thereto. For example, the terminal device 100 may output different content items, such as different landing pages, according to an operation which is input when the proportion of the region in which the web page C10 is displayed and the proportion of the region in which the advertising content item C11 is displayed are fixed.

Figure 7:
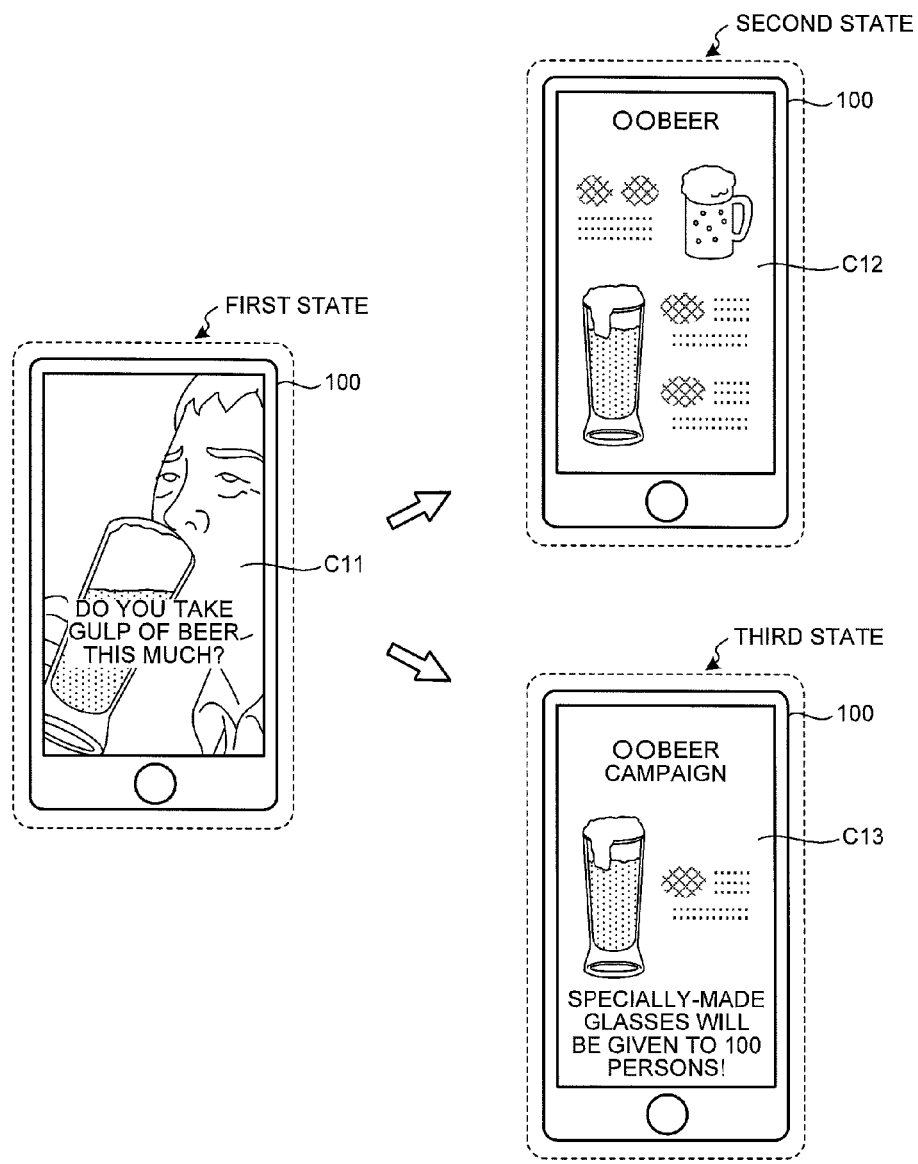
FIG. 7 is a diagram illustrating an example of the output of a landing page by the terminal device according to the embodiment.

For example, FIG. 7 is a diagram illustrating an example of a landing page output process of the terminal device according to the embodiment. For example, when the inclination angle of the terminal device 100 exceeds a predetermined threshold value, the terminal device 100 displays the advertising content item C11 on the entire screen, as illustrated in the first state in FIG. 7. In this state, when the user taps the screen, that is, when the user selects the advertising content item C11, the terminal device 100 displays a landing page C12 corresponding to the advertising content item C11, as illustrated in the second state in FIG. 7.

On the other hand, in the first state illustrated in FIG. 7, when the user performs a predetermined operation, the terminal device 100 displays a landing page C13 different from the landing page C12, as illustrated in the third state in FIG. 7. For example, the terminal device 100 displays the landing page C13, as illustrated in the third state in FIG. 7, when detecting any detectable operation by the terminal device 100, for example, when detecting a predetermined operation, such as the operation of the user touching the screen, through the input unit 120, or when detecting an impact applied to the terminal device 100 using the physical sensor 140.

As such, the terminal device 100 can motivate the user to perform various operations even after displaying the entire advertising content item C11. Therefore, the terminal device 100 can make the user interested in an advertisement.

A process of outputting the landing page is not limited to the above-mentioned process. The terminal device 100 may output a landing page according to arbitrary conditions. For example, the terminal device 100 may output the landing pages C12 and C13, according to a change in the inclination of the terminal over time after a portion of the advertising content item C11 is displayed on the screen, that is, the terminal device 100 is inclined.

For example, when the terminal device 100 is inclined at a predetermined angle or more within a predetermined period of time after a portion of the advertising content item C11 is displayed on the screen, the terminal device 100 may display a landing page having the image of a glass of beer with thick froth. When the terminal device 100 is not inclined at a predetermined angle or more within a predetermined period of time after a portion of the advertising content item C11 is displayed on the screen, the terminal device 100 may display a landing page having the image of a glass of beer with thin froth.

When the terminal device 100 is inclined to a predetermined angle at a predetermined rate of increase within a predetermined period of time after a portion of the advertising content item C11 is displayed on the screen, the terminal device 100 may display the image of a glass of beer with proper froth and display a landing page for entering for a campaign. In addition, the terminal device 100 may output the landing page based on an operation. For example, when a first operation of inclining the terminal device 100 at a large angle is performed, the terminal device 100 suddenly displays the landing page C12. When a second operation of largely shaking the terminal device 100 is performed, the terminal device 100 suddenly displays the landing page C13. That is, the terminal device 100 may output a landing page, according to an arbitrary operation, such as the inclination of the terminal device 100 or the rate of change in the inclination over time.

7-4. Type of Content

In the above-mentioned example, the terminal device 100 displays, as the advertising content item C11, the image in which, for example, the product to be advertised is arranged. However, the embodiment is not limited thereto. For example, the terminal device 100 may display a moving image as the advertising content item C11. In this case, when the terminal device 100 is inclined and the region in which advertising content is displayed accounts for half the screen, the terminal device 100 may reproduce the moving image. In addition, the terminal device 100 may display the advertising content item C11 and reproduce a sound such as a sizzling sound. The terminal device 100 may change the volume of the sound to be reproduced, depending on the inclination angle of the terminal device 100.

7-5. For Inclination of Terminal Device 100

In the above-mentioned example, the terminal device 100 detects the rotation of the terminal device 100 about each axis which passes through the terminal device 100, that is, the inclination of the terminal device 100. Then, the terminal device 100 changes the proportion of the region in which the web page C10 is displayed and the proportion of the region in which the advertising content item C11 is displayed, depending on the inclination direction of the terminal device 100. Here, the terminal device 100 may detect the inclination based on an arbitrary state. For example, the terminal device 100 may measure the direction of the gravity of the Earth using the gyro sensor and specify a coordinate system in which the measured direction of the gravity of the Earth is the Y-axis. Then, the terminal device 100 may detect the inclination angle of the terminal device 100 in the specified coordinate system. That is, the terminal device 100 may detect the inclination angle of the screen of the terminal device 100 with respect to the direction of the gravity of the Earth.

In addition, when receiving the web page C10 and the advertising content item C11, the terminal device 100 may display the web page C10 and specify the inclination angle of the screen of the terminal device 100 based on the direction of the gravity of the Earth. Then, the terminal device 100 may detect the inclination angle of the terminal device 100 on the basis of the specified angle. That is, the terminal device 100 may detect a variation in the inclination angle of the screen of the terminal device 100 with respect to the direction of the gravity of the Earth when the web page C10 is received and displayed and a variation in the angle when the terminal device 100 is inclined by the user and change the proportion of the region in which the web page C10 is displayed and the proportion of the region in which the advertising content item C11 is displayed, depending on the detected variations.

8. Flow of Process of Advertisement Distribution System

Figure 8:
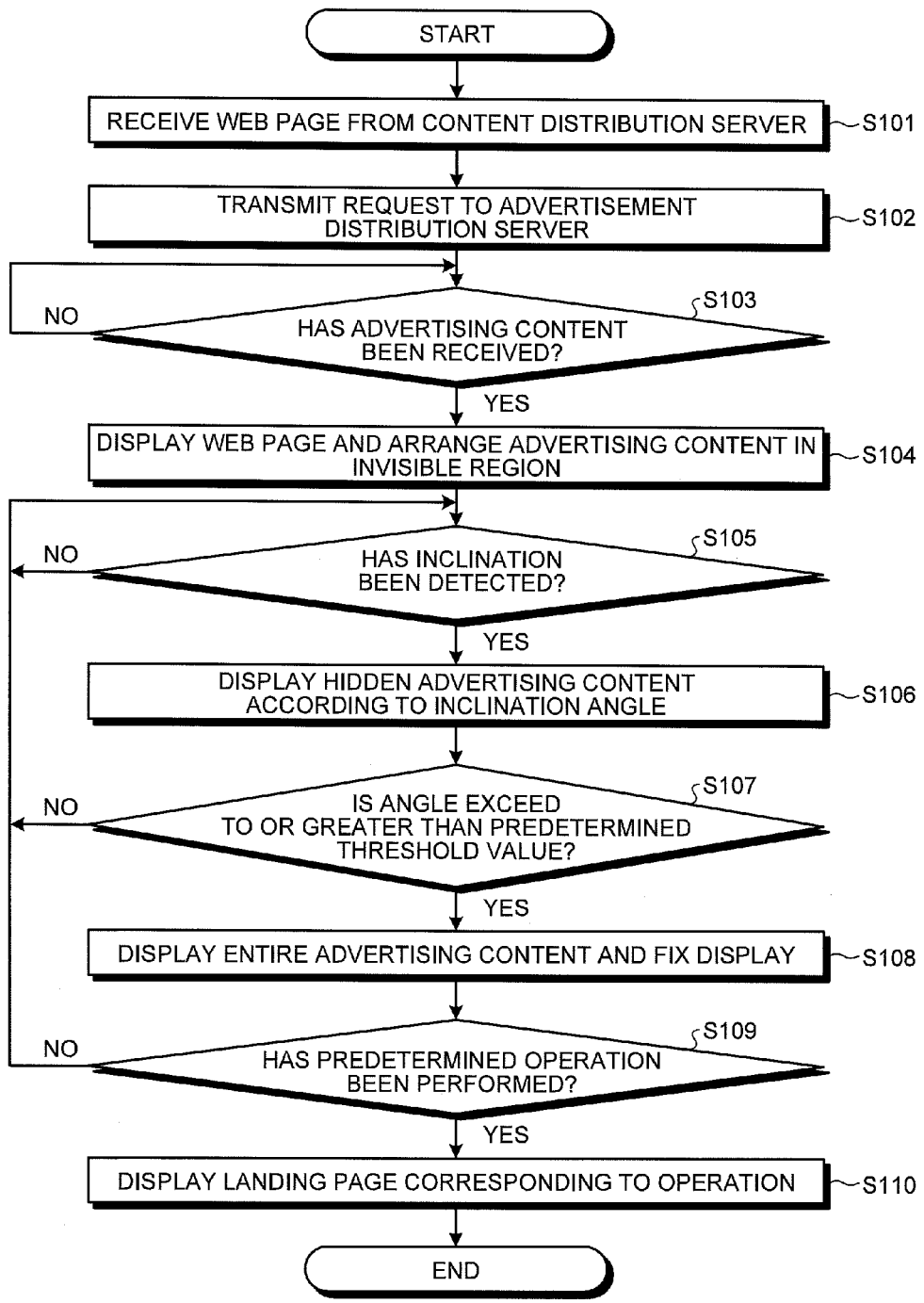
FIG. 8 is a flowchart illustrating an example of the flow of an advertisement display process performed by the terminal device according to the embodiment.

Next, the flow of the process of the terminal device 100 which executes the control information will be described with reference to FIG. 8. FIG. 8 is a flowchart illustrating the flow of the advertisement display process of the terminal device according to the embodiment.

In the example illustrated in FIG. 8, the terminal device 100 requests the content distribution server 30 to distribute the web page C10 in response to the operation of the user and receives the web page C10 from the content distribution server 30 (Step S101). Then, when an advertisement acquisition command is included in the distributed web page C10, the terminal device 100 transmits a distribution request to the advertisement distribution server 20 (Step S102). Then, the terminal device 100 determines whether the advertising content item C11 has been received (Step S103). Then, when it is determined that the advertising content item C11 has not been received (Step S103: No), the terminal device 100 performs Step S103 again.

When the advertising content item C11 has been received (Step S103: Yes), the terminal device 100 displays the web page C10 and arranges the advertising content item C11 in a region outside the screen, that is, an invisible region (Step S104). Then, the terminal device 100 determines whether the physical sensor 140 detects the inclination of the terminal device 100 (Step S105). When the inclination of the terminal device 100 is detected (Step S105: Yes), the terminal device 100 displays the advertising content which is concealed from the screen, according to the inclination angle (Step S106). That is, the terminal device 100 changes the proportion of the region in which the web page C10 is displayed and the proportion of the region in which the advertising content item C11 is displayed, depending on the inclination angle, and displays the advertising content item C11.

The terminal device 100 determines whether the inclination angle exceeds a predetermined threshold value (Step S107). When the inclination angle exceeds the predetermined threshold value (Step S107: Yes), the terminal device 100 displays the entire advertising content item C11 and fixes the proportion of the regions (Step S108). Then, the terminal device 100 determines whether a predetermined operation has been performed (Step S109). When a predetermined operation has been performed (Step S109: Yes), the terminal device 100 displays a landing page corresponding to the operation (Step S110) and ends the process.

On the other hand, when the inclination of the terminal device 100 is not detected (Step S105: No), the terminal device 100 performs Step S105 again. When the inclination angle does not exceed the predetermined threshold value (Step S107) or when a predetermined operation has not been performed (Step S109: No), the terminal device 100 performs Step S105.

9. Modifications

The advertisement distribution system 1 according to the above-described embodiment is not limited to the above-described embodiment and may be modified in various ways. Hereinafter, other embodiments of the advertisement distribution system 1 will be described.

9-1. For Log

The terminal device 100 may acquire the log of the advertising content which is actually displayed or the log of the advertising content selected by the user. For example, when the user ends the display of the web page C10 without inclining the terminal device 100, the terminal device 100 acquires a log indicating that the advertising content item C11 has not been browsed. On the other hand, when the user inclines the terminal device 100 to display the advertising content item C11, the terminal device 100 acquires a log indicating that the advertising content item C11 has been browsed. In a case in which the proportion of the region in which the web page C10 or the advertising content item C11 is displayed is fixed, when the advertising content item C11 is selected or when a predetermined operation is performed, the terminal device 100 acquires a log indicating that the advertising content item C11 has been selected or a log indicating that a predetermined operation has been performed.

As such, the log acquired by the terminal device 100 is useful to update the CTR of each advertising content item or to inform the advertiser of the effect of advertisement. In addition, the log acquired by the terminal device 100 may be used to change the content arranged in the landing page. For example, when the user selects the advertising content item C11 or when a predetermined operation is performed, the terminal device 100 acquires the same landing page and notifies the server which distributes the landing page that the user has selected the advertising content item C11 or a predetermined operation has been performed. In this case, the server which distributes the landing page may specify content to be arranged in the landing page, on the basis of whether the user selects the advertising content item C11 or whether a predetermined operation is performed, and instruct the terminal device 100 to arrange the specified content in the landing page.

The terminal device 100 may output the landing page, according to the state of the acquired log. For example, when a predetermined process is performed until a predetermined number of users visit the landing page C13, the terminal device 100 may display the landing page C13. After a predetermined number of users visit the landing page C13, the terminal device 100 may not display the landing page C13 and may display the landing page C12 even though the predetermined process is performed. The terminal device 100 may output the landing pages on the basis of the CTRs of the landing pages C12 and C13. In addition, the terminal device 100 may change the landing page, depending on the difference (that is, the number of advertisements in stock) between the number of times the landing page C12 and the landing page C13 are displayed and the minimum number of times the content the landing page C12 and the landing page C13 are displayed.

9-2. For Control Information

The terminal device 100 performs the above-mentioned display process, using the control information which is distributed together with the advertising content by the advertisement distribution server 20. However, the embodiment is not limited thereto. For example, the terminal device 100 may receive the control information together with the web page from the content distribution server 30 and receive a display instruction together with advertising content from the advertisement distribution server 20. Then, the terminal device 100 may execute the control information received from the content distribution server 30 and change the display mode of the advertising content in response to the received display instruction.

The terminal device 100 may download in advance an application which causes the terminal device 100 to perform, for example, a process of displaying the web page C10 and the above-mentioned advertisement display process and execute the application to implement the above-mentioned processes.

9-3. Structure of Device

In the above-described embodiment, the advertisement distribution system 1 includes the advertisement distribution server 20 and the content distribution server 30. The advertisement distribution server 20 and the content distribution server 30 may be integrated into one device. In this case, the advertisement distribution server 20 illustrated in FIG. 3 includes, for example, the content storage unit 32, the receiving unit 34, and the distribution unit 35 illustrated in FIG. 5. When receiving a web page acquisition request from the terminal device 100, the advertisement distribution server 20 distributes advertising content and a web page without an advertisement acquisition command to the terminal device 100.

In the above-described embodiment, advertising content is distributed from the advertisement distribution server 20 to the terminal device 100. However, the content distribution server 30 may acquire advertising content from the advertisement distribution server 20. In this case, the request receiving unit 26 of the advertisement distribution server 20 receives an advertising content acquisition request from the content distribution server 30. The advertisement distribution server 20 distributes advertising content to the content distribution server 30. The content distribution server 30 distributes the advertising content acquired from the advertisement distribution server 20 and a web page without an advertisement acquisition command to the terminal device 100.

9-4. Recording of Operation of Terminal Device

The terminal device 100 may transmit, to the advertisement distribution server 20, a record of the operation of the terminal device 100 for the web page, in which the advertising content according to the embodiment is arranged, by the user. Specifically, the terminal device 100 records, for example, the scroll operation of the user for the web page in which advertising content is arranged, a web page enlargement/reduction operation, and the physical state of the terminal device 100, such as whether the physical sensor 140 measures the inclination of the terminal device 100 or the inclination angle of the terminal device 100 measured by the physical sensor 140.

In addition, the terminal device 100 may record various operations of the user for the terminal device 100, such as a click operation for advertising content, the number of times a web page is reloaded, and an operation of transmitting information for specifying advertising content from the terminal device (for example, an operation of writing data to an SNS). Then, the terminal device 100 transmits information about an operation history to the advertisement distribution server 20.

In this case, the advertisement distribution server 20 collects the information about the operation history transmitted from the terminal device 100 and further acquires the analysis information of the collected information. For example, the advertisement distribution server 20 acquires the number of scroll operations, the number of times the user inclines the terminal device 100, the inclination angle of the terminal device 100, and information indicating the result of the comparison between the indexes of the advertising effect, such as CTRs, from advertising content involving the control information according to the embodiment and advertising content without involving the control information.

An operation history for the web page in which the advertising content involving the control information according to the embodiment is displayed may be an index indicating the advertising effect. That is, in the web page in which the advertising content involving the control information according to the embodiment is displayed, not only the display of the web page, which is the destination of the advertising content, by the click operation of the user for the advertising content but also the history of the operation of the user for the web page, such as the inclination angle of the terminal device 100 (that is, the degree of change in the display mode of the web page by the user) are indexes indicating the interest of the user in the advertising content.

For example, the advertisement distribution server 20 can compare, for example, the number of times the user inclines the terminal device 100, the inclination angle of the terminal device 100, and the time required to incline the terminal device 100 to provide an index indicating the interest of the user in an advertisement when the advertising content involving the control information according to the embodiment is displayed. Therefore, the advertisement distribution server 20 can transmit information about the operation history of the terminal device 100 to the advertiser terminal 10 and use the information as a report indicating the index of the advertising effect of the web page in which the advertising content according to the embodiment is displayed. The advertisement distribution server 20 may transmit the information about the operation history of the terminal device 100 to the advertiser terminal 10 without any change.

In this way, the advertisement distribution server 20 shows the usability of the display mode of the advertising content involving the control information according to the embodiment in the terminal device 100 to the advertiser.

Here, the advertisement distribution server 20 may charge the advertiser for the distribution of advertising content on the basis of the operation history distributed from the terminal device 100. For example, the advertisement distribution server 20 may charge the advertiser for the distribution of advertising content on the basis of, for example, the number of times the advertising content item C11 is displayed, the number of selections of the advertising content, and the number of changes to the landing page C12, and the number of changes to the landing page C13. In addition, the advertisement distribution server 20 may charge the advertiser for the distribution of advertising content when the number of times advertising content is selected is equal to or greater than a predetermined value or when the advertising content is displayed or operated for a predetermined period of time or more. The advertisement distribution server 20 may dynamically change the amount of money charged to the advertiser, on the basis of the operation history distributed from the terminal device 100.

As such, the advertisement distribution server 20 charges the advertiser for the distribution of advertising content, on the basis of, for example, the number of times advertising content is selected, the display time of advertising content, and the operation of the user of the terminal device 100 for advertising content. That is, the advertisement distribution server 20 can charge the advertiser for the distribution of advertising content, on the basis of information which can objectively indicate whether the user has recognized advertising content, that is, an index indicating the degree of branding. As a result, the advertisement distribution server 20 can solve the problem of the advertisement distribution technique according to the related art that is less likely to appropriately indicate the degree of branding. Therefore, the advertisement distribution server 20 can appropriately present the degree of branding or can perform billing on the basis of the appropriate degree of branding.

9-5. Others

Among the processes according to the above-described embodiment, some or all of the processes which are automatically performed may be manually performed, or some or all of the processes which are manually performed may be automatically performed by a known method. In addition, information including the flow of the processes, the detailed names, various kinds of data and parameters described in the specification and the drawings can be arbitrarily changed except that it is specified. For example, various kinds of information described in each of the drawings are not limited to the illustrated information.

The functional concept of each component of each device is illustrated in the drawings and each component does not necessarily have the physical structure illustrated in the drawings. That is, the detailed form of the distribution and integration of the above-mentioned device is not limited to that illustrated in the drawings and some or all of the devices may be functionally or physically distributed or integrated in an arbitrary unit according to, for example, various types of load or usage conditions. For example, the request unit 151 and the operation control unit 152 illustrated in FIG. 6 may be integrated with each other.

The above-described embodiments can be appropriately combined with each other in a range in which the content of processing is consistently maintained.

9-6. Program

Figure 9:
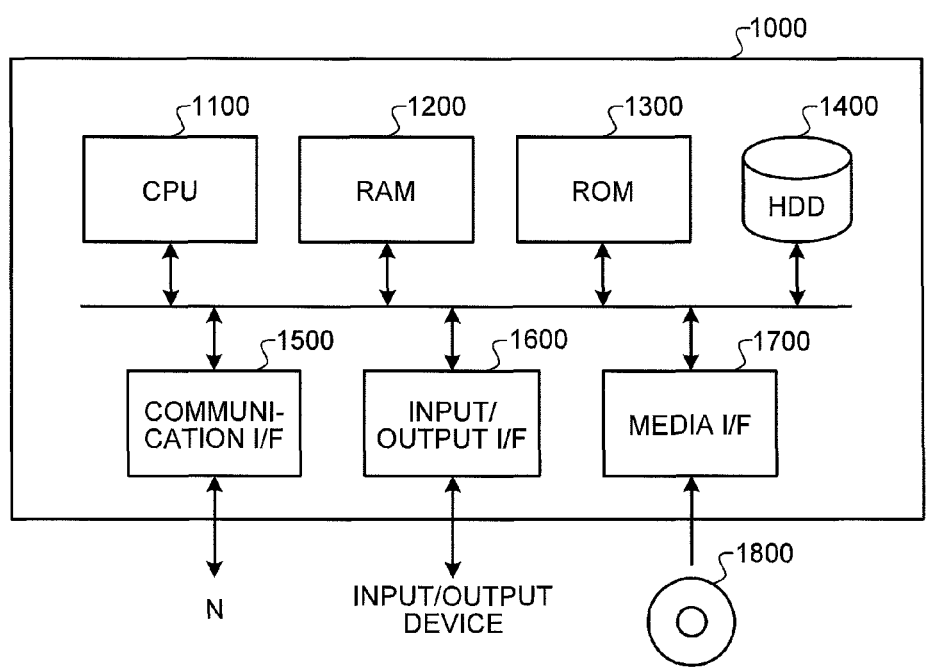
FIG. 9 is a diagram illustrating an example of the hardware configuration of a computer that implements the functions of the advertisement distribution server.

The terminal device 100, the advertisement distribution server 20, and the content distribution server 30 according to the above-described embodiments are implemented by, for example, a computer 1000 having the structure illustrated in FIG. 9. Next, description will be made using the advertisement distribution server 20 as an example. FIG. 9 is a diagram illustrating an example of the hardware configuration of a computer which implements the functions of the advertisement distribution server. The computer 1000 includes a CPU 1100, RAM 1200, ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400 and controls each unit. The ROM 1300 stores, for example, a boot program which is executed by the CPU 1100 during the start-up of the computer 1000 or a program which depends on the hardware of the computer 1000.

The HDD 1400 stores, for example, a program which is executed by the CPU 1100 and data which is used by the program. The communication interface 1500 receives data from other devices through the network N, transmits the data to the CPU 1100, and transmits data generated by the CPU 1100 to other devices.

The CPU 1100 controls an output device, such as a display or a printer, and an input device, such as a keyboard or a mouse, through the input/output interface 1600. The CPU 1100 acquires data from the input device through the input/output interface 1600. In addition, the CPU 1100 outputs the generated data to the output device through the input/output interface 1600.

The media interface 1700 reads a program, such as an information display program, or data stored in a recording medium 1800, which is an example of a non-transitory computer readable storage medium, and provides the program or the data to the CPU 1100 through the RAM 1200. The CPU 1100 loads the program from the recording medium 1800 to the RAM 1200 through the media interface 1700 and executes the loaded program. The recording medium 1800 is, for example, an optical recording medium, such as a digital versatile disc (DVD) or a phase change rewritable disk (PD), a magneto-optical recording medium, such as a magneto-optical disk (MO), a tape medium, a magnetic recording medium, or a semiconductor memory.

For example, when the computer 1000 functions as the advertisement distribution server 20 according to the embodiment, the CPU 1100 of the computer 1000 executes the program loaded to the RAM 1200 to implement the functions of the control unit 23. In addition, the HDD 1400 stores data in the storage unit 22, that is, the advertisement database 24. The CPU 1100 of the computer 1000 reads the programs from the recording medium 1800 and executes the programs. Alternatively, the CPU 1100 may acquire the programs from other devices.

When the computer 1000 functions as the terminal device 100 according to the embodiment, the CPU 1100 of the computer 1000 executes the program loaded to the RAM 1200 to implement the functions of the control unit 150.

When the computer 1000 functions as the content distribution server 30 according to the embodiment, the CPU 1100 of the computer 1000 executes the program loaded to the RAM 1200 to implement the functions of the control unit 33. In addition, the HDD 1400 stores data in the content storage unit 32.

10. Effect

As described above, the terminal device 100 displays the web page C10, which is the first content, in a region which accounts for a predetermined proportion of the screen and displays the advertising content item C11, which is the second content, in another region. In addition, the terminal device 100 detects the inclination of the terminal device 100 based on, for example, the direction of the gravity of the Earth or the state of the terminal device 100 when the web page C10 is displayed. Then, the terminal device 100 changes the proportion of the region in which the web page C10 is displayed and the proportion of the region in which the advertising content item C11 is displayed in the screen, depending on the detection result. Therefore, the terminal device 100 can make the user interested in arbitrary content such as advertising content.

The terminal device 100 changes the proportion of the region in which the web page C10 is displayed and the proportion of the region in which the advertising content item C11 is displayed, depending on the inclination angle of the terminal device 100. Therefore, the terminal device 100 displays the advertising content item C11 in such a way that the display of the advertising content item C11 on the screen is gradually changed, depending on the inclination angle of the terminal device 100. As a result, it is possible to make the user interested in arbitrary content such as advertising content.

When the inclination angle of the terminal device 100 exceeds a predetermined threshold value, the terminal device 100 changes the proportion of each region until the entire region in which the advertising content item C11 is displayed is displayed on the screen. Therefore, the terminal device 100 switches the content to be displayed from the web page C10 to the advertising content item C11 and can impress an advertisement on the user.

When the inclination angle of the terminal device 100 exceeds the predetermined threshold value, the terminal device 100 changes the proportion of each region until the advertising content item C11 is displayed on the entre screen. Therefore, the terminal device 100 switches the content to be displayed from the web page C10 to the advertising content item C11 and can impress an advertisement on the user.

When the inclination angle of the terminal device 100 exceeds the predetermined threshold value, the terminal device 100 fixes the proportion of the region in which the web page C10 is displayed and the proportion of the region in which the advertising content item C11 is displayed. Therefore, when the user inclines the terminal device 100 at an angle greater than a predetermined value, the terminal device 100 can continuously display the advertising content item C11 even though the terminal device 100 returns to the original inclination. As a result, the terminal device 100 can impress an advertisement on the user.

In a case in which the proportion of the region in which the web page C10 is displayed and the proportion of the region in which the advertising content item C11 is displayed are fixed, when the user selects the advertising content, the terminal device 100 displays the advertising content item C11 which can change to predetermined content. For example, in a case in which the proportion of the region in which the web page C10 is displayed and the proportion of the region in which the advertising content item C11 is displayed are fixed, when the user selects the advertising content item C11, the terminal device 100 acquires the landing page C12 which is associated with the advertising content item C11 by, for example, a link and displays the landing page C12. Therefore, the terminal device 100 can urges the user to perform an operation of displaying content corresponding to the advertising content item C11.

When the proportion of the region in which the web page C10 is displayed and the proportion of the region in which the advertising content item C11 is displayed are fixed, the terminal device 100 displays the advertising content item C11 which can change to content corresponding to the content of the operation of the user. For example, the terminal device 100 displays the landing page C12 or the landing page C13 according to the operation of the user. Therefore, the terminal device 100 can motivate the user to perform various operations. As a result, it is possible to make the user interested in advertising content.

The terminal device 100 moves the position of the region in which the web page C10 is displayed and the position of the region in which the advertising content item C11 is displayed to change the proportion of each region in the screen. Therefore, the terminal device 100 can make the user interested in arbitrary content such as advertising content.

The terminal device 100 moves the position of the region in which the web page C10 is displayed and the position of the region in which the advertising content item C11 is displayed by a distance corresponding to the inclination angle of the terminal device 100. Therefore, the terminal device 100 can motivate the user to incline the terminal device 100 at various angles. As a result, it is possible to make the user interested in advertising content.

The terminal device 100 changes the position of the region in which the web page C10 is displayed and the position of the region in which the advertising content item C11 is displayed, depending on the inclination direction of the terminal device 100. For example, when the terminal device 100 is inclined in a predetermined direction, the terminal device 100 changes the position of the region in which the web page C10 is displayed and the position of the region in which the advertising content item C11 is displayed. Therefore, the terminal device 100 can motivate the user to incline the terminal device 100 at various directions. As a result, it is possible to make the user interested in advertising content.

When the terminal device 100 is not inclined, the terminal device 100 displays the web page C10 on the entire screen. Therefore, when the user inclines the terminal device 100, the terminal device 100 displays the advertising content item C11 in such a way that the advertising content item C11 is gradually displayed. As a result, it is possible to make the user interested in advertising content.

Some embodiments of the invention have been described in detail above with reference to the drawings. However, the embodiments are illustrative. Various modifications and changes of the invention can be made on the basis of the knowledge of those skilled in the art including the aspects described in the Disclosure of the Invention.

The term "unit (section or module)" can be replaced with, for example, a "means" or a "circuit". For example, the distribution unit can be replaced with a distribution means or a distribution circuit.

According to an embodiment, it is possible to improve the advertising effect of advertising content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display device, which is a smart device, the information display device comprising:
    a touch panel display;
    a sensor configured to measure an inclination angle of the information display device with respect to a level of a ground; and
    a processor operatively coupled with a memory, the processor being programmed to:
        display a first display region inside of a touch panel display screen of the information display device, and arrange a second display region adjacent to the first display region outside of the touch panel display screen;
        arrange: (i) a web content in the first display region, and (ii) an advertisement content in the second display region;
        measure, by the sensor, an inclination angle of the information display device;
        regardless of a touch input to the touch panel display screen when the measured inclination angle of the information display device changes from a predetermined angle, gradually change an area ratio of the first display region to the second display region displayed in the touch panel display screen by sliding the first display region and the second display region without changing the scale size of the web content and the advertisement content;
        slide down or slide up the advertisement content from an edge of the touch panel display screen based on the gradual change of the area ratio of the first display region to the second display region displayed in the touch panel display screen; and
        display, in the touch panel display screen, the advertisement content based on the changing area ratio of the first display region to the second display region in the touch panel display screen.

2. The information display device according to claim 1, wherein the processor is programmed to change the area ratio of the region in which the first content is displayed and the area ratio of the region in which the second content is displayed, depending on the inclination angle of the information display device.

3. The information display device according to claim 1, wherein, when the inclination angle of the information display device exceeds a predetermined threshold value, the processor is programmed to change the area ratio of each region to the display region until the entire second content is displayed.

4. The information display device according to claim 1, wherein, when the inclination angle of the information display device exceeds a predetermined threshold value, the processor is programmed to change the area ratio of each region to the display region until the second content is displayed in the entire display region.

5. The information display device according to claim 1, wherein, when the inclination angle of the information display device exceeds a predetermined threshold value, the processor is programmed to fix the area ratio of the region in which the first content is displayed to the display region and the area ratio of the region in which the second content is displayed to the display region.

6. The information display device according to claim 5, wherein, the processor is programmed to display the second content that changes to a landing page of an advertiser of the second content when the area ratio of each region in the display region is fixed and the second content is selected.

7. The information display device according to claim 5, wherein the processor is programmed to display the second content that changes to content corresponding to the content of an operation that is performed when the area ratio of each region to the display region is fixed.

8. The information display device according to claim 1, wherein the processor is programmed to move a position of the region in which the first content is displayed and a position of the region in which the second content is displayed based on the inclination angle of the information display device.

9. The information display device according to claim 1, wherein the processor is programmed to change a position of the region in which the first content is displayed and a position of the region in which the second content is displayed based on an inclination direction of the information display device.

10. The information display device according to claim 9, wherein, when the information display device is inclined in a predetermined direction, the processor is programmed to change the position of the region in which the first content is displayed and the position of the region in which the second content is displayed.

11. The information display device according to claim 1, wherein the processor is programmed to set the entire display region as the region in which the first content is displayed when the inclination of the information display device is not detected or when the information display device receives the first content.

12. A distribution device comprising:
a processor configured to distribute control information for controlling a display mode of web content and advertisement content to an information display device, which is a smart device, the information display device including a touch panel display, and a sensor configured to measure an inclination angle of the information display device with respect to a level ground, the control information causing the information display device to perform a process, the process including:
displaying a first display region inside of a touch panel display screen of the information display device, and arranging a second display region adjacent to the first display region outside of the touch panel display screen;
arranging: (i) the web content in the first display region, and (ii) the advertisement content in the second display region;
measuring, by the sensor, an inclination angle of the information display device;
regardless of a touch input to the touch panel display screen when the measured inclination angle of the information display device changes from a predetermined angle, gradually changing an area ratio of the first display region to the second display region displayed in the touch panel display screen by sliding the first display region and the second display region without changing the scale size of the web content and the advertisement content;
sliding down or sliding up the advertisement content from an edge of the touch panel display screen based on the gradual change of the area ratio of the first display region to the second display region displayed in the touch panel display screen; and
displaying, in the touch panel display screen, the advertisement content based on the changing area ratio of the first display region to the second display region in the touch panel display.

13. An information display method that is performed by an information display device, which is a smart device, the information display device including a touch panel display, and a sensor configured to measure an inclination angle of the information display device with respect to a level ground, the information display method comprising:
a display and arrange step of displaying a first display region inside of a touch panel display screen of the information display device, and arranging a second display region adjacent to the first display region outside of the touch panel display screen;
an arrange step of arranging: (i) a web content in the first display region, and (ii) a advertisement content in the second display region;
a measure step of measuring, by the sensor, an inclination angle of the information display device;
a change step of, regardless of a touch input to the touch panel display screen when the measured inclination angle of the information display device changes from a predetermined angle, gradually changing an area ratio of the first display region to the second display region displayed in the touch panel display screen by sliding the first display region and the second display region without changing the scale size of the web content and the advertisement content;
a sliding step of sliding down or sliding up the advertisement content from an edge of the touch panel display screen based on the gradual change of the area ratio of the first display region to the second display region displayed in the touch panel display screen; and
a display step of displaying, in the touch panel display screen, the advertisement content based on the changing area ratio of the first display region to the second display region in the touch panel display screen.

14. A non-transitory computer readable storage medium having stored therein an information display program that causes a computer to perform a process comprising:
displaying a first display region inside of a touch panel display screen of a touch panel display of an information display device, which is a smart device, and arranging a second display region adjacent to the first display region outside of the touch panel display screen;
arranging: (i) a web content in the first display region, and (ii) an advertisement content in the second display region;
measuring, by the sensor, an inclination angle of the information display device;
regardless of a touch input to the touch panel display screen when the measured inclination angle of the information display device changes from a predetermined angle, gradually changing an area ratio of the first display region to the second display region displayed in the touch panel display screen by sliding the first display region and the second display region without changing the scale size of the web content and the advertisement content;
sliding down or sliding up the advertisement content from an edge of the touch panel display screen based on the gradual change of the area ratio of the first display region to the second display region displayed in the touch panel display screen; and
displaying, in the touch panel display screen, the advertisement content based on the changing area ratio of the first display region to the second display region in the touch panel display screen.

* * * * *